(12) United States Patent
Gustafson et al.

(10) Patent No.: US 7,559,061 B1
(45) Date of Patent: Jul. 7, 2009

(54) SIMULTANEOUS MULTI-THREADING CONTROL MONITOR

(75) Inventors: Martin Bernard Gustafson, Kasson, MN (US); Kenneth Eugene Yates, Rochester, MN (US); Craig Lee Kuhlman, Travelers Rest, SC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/049,338

(22) Filed: Mar. 16, 2008

(51) Int. Cl.
*G06F 9/46* (2006.01)
*G06F 9/44* (2006.01)

(52) U.S. Cl. .................. 718/100; 718/102; 718/103; 712/226; 712/229

(58) Field of Classification Search .............. 718/1, 718/100, 101, 102, 103, 104, 105, 106, 107, 718/108; 712/20, 21, 220, 221, 223, 224, 712/225, 226, 227, 228, 229
See application file for complete search history.

(56) References Cited

U.S. PATENT DOCUMENTS

| | | | |
|---|---|---|---|
| 4,901,230 A | | 2/1990 | Chen et al. |
| 6,076,157 A | * | 6/2000 | Borkenhagen et al. ...... 712/228 |
| 6,651,158 B2 | * | 11/2003 | Burns et al. ................ 712/205 |
| 7,155,600 B2 | * | 12/2006 | Burky et al. ................ 712/229 |
| 7,254,697 B2 | * | 8/2007 | Bishop et al. ............... 712/213 |
| 2004/0215932 A1 | * | 10/2004 | Burky et al. .................. 712/43 |
| 2004/0215939 A1 | * | 10/2004 | Armstrong et al. .......... 712/220 |
| 2004/0216113 A1 | * | 10/2004 | Armstrong et al. .......... 718/104 |
| 2004/0216120 A1 | * | 10/2004 | Burky et al. ................ 718/107 |
| 2005/0223199 A1 | | 10/2005 | Grochowski et al. |
| 2006/0085368 A1 | * | 4/2006 | Moilanen et al. .............. 706/45 |
| 2006/0136915 A1 | | 6/2006 | Aingaran et al. |
| 2006/0184768 A1 | * | 8/2006 | Bishop et al. ............... 712/215 |
| 2006/0242389 A1 | * | 10/2006 | Browning et al. ........... 712/229 |
| 2007/0200227 A1 | * | 8/2007 | Licht et al. .................. 718/102 |
| 2008/0134180 A1 | * | 6/2008 | Floyd ......................... 718/100 |
| 2008/0177682 A1 | * | 7/2008 | Moilanen et al. .............. 706/13 |
| 2008/0263325 A1 | * | 10/2008 | Kudva et al. ................ 712/203 |

FOREIGN PATENT DOCUMENTS

| | | |
|---|---|---|
| EP | 1029269 B1 | 9/2003 |
| WO | WO00146827 A1 | 6/2001 |
| WO | WO2006083543 A2 | 8/2006 |

OTHER PUBLICATIONS

P. Mackerra, T. S. Mathews, R. C. Swanberg; Operating system exploitation of the POWER5 system; IBM J. RES. & DEV. vol. 49 No. 4/5 Jul./Sep. 2005.*
B. Sinharoy, R. N. Kalla, J. M. Tendler, R. J. Eickemeyer, J. B. Joyner; POWER5 system microarchitecture; IBM J. RES. & DEV. vol. 49 No. 4/5 Jul./Sep. 2005.*

* cited by examiner

*Primary Examiner*—Lewis A. Bullock, Jr.
*Assistant Examiner*—Abdullah Al Kawsar
(74) *Attorney, Agent, or Firm*—MaxValueIP, LLC

(57) ABSTRACT

One example would provide for maximum throughput thus increasing capacity during times when only low and medium priority work is running while allowing for the shorter turn around times required by critical work. Moreover, it creates a "SMT Control Monitor" (SCM) which would examine the type of work running on the machine. This monitor would turn ON/OFF SMT feature, and suspend/resume job threads as the work load demanded. This idea is different than other SMT control disclosures because it incorporates information from the batch system. This additional information will be used to better manage the state of SMT and the job threads.

1 Claim, 3 Drawing Sheets

SIMULTANEOUS MULTI-THREADING CONTROL MONITOR

BACKGROUND OF THE INVENTION

Simultaneous multithreading is a processor design that combines hardware multithreading with superscalar processor technology to allow multiple threads to issue instructions each cycle. Unlike other hardware multithreaded architectures, in which only a single hardware context (i.e., thread) is active on any given cycle, SMT permits all thread contexts to simultaneously compete for and share processor resources. Unlike conventional superscalar processors, which suffer from a lack of per-thread instruction-level parallelism, simultaneous multithreading uses multiple threads to compensate for low single-thread. The performance consequence is significantly higher instruction throughput and program speed-ups on a variety of workloads The IBM/R6000 Power 5 and 6 architectures support running multiple threads on a single processor. This is possible because of the "Simultaneous Multi-Threading" (SMT) processor design. SMT enables several process threads to coexist on a single physical processor at one time. This technology maximizes the use of otherwise unused processor cycles increasing the overall work throughput (TPT) of the processor.

SUMMARY OF THE INVENTION

One embodiment would provide for maximum throughput thus increasing capacity during times when only low and medium priority work is running while allowing for the shorter turn around times required by critical work. While this idea targets the IBM/R6000 Power 5 and 6 architectures, it could be easily extended to other multi-threading architectures provided the target architecture has a mechanism for dynamically disabling and enabling multi-threading on the system.

One embodiment is to create a "SMT Control Monitor" (SCM) which would examine the type of work running on the machine. This monitor would turn ON/OFF SMT feature, and suspend/resume job threads as the work load demanded. This idea is different than other SMT control disclosures because it incorporates information from the batch system. This additional information will be used to better manage the state of SMT and the job threads.

DETAILED DESCRIPTION OF THE PREFERRED EMBODIMENTS

To maximize the use of SMT, it is desirable to fully saturate the available threads. This is done by turning SMT ON, and scheduling multiple threads for each physical processor. This increases the total number of jobs completed over time at the expense of the individual job turn around time (TAT). A solution is needed to ensure the time sensitive critical work gets the shortest possible turn around time while still increasing the overall capacity by enabling SMT.

Figure 1:
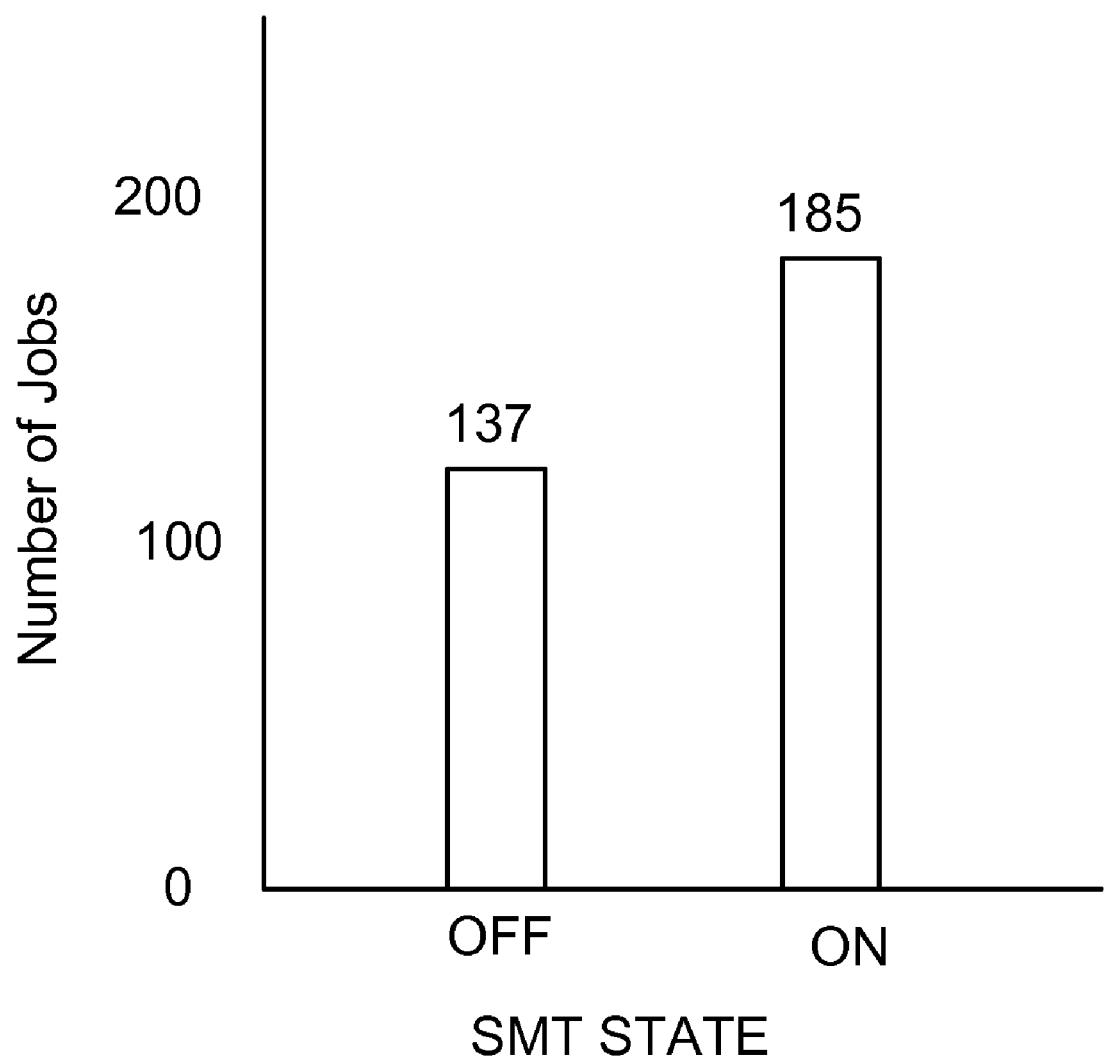
FIG. 1 is a chart average number of jobs competed within 24 hours on a 2 way Power 5 system

The chart in FIG. 1 shows the average number of jobs competed within 24 hours on a 2 way Power 5 system. The first bar shows SMT OFF, and running 2 job threads and the second shows SMT ON, and running 4 job threads. This shows turning on SMT increased the capacity by 35%.

Figure 2:
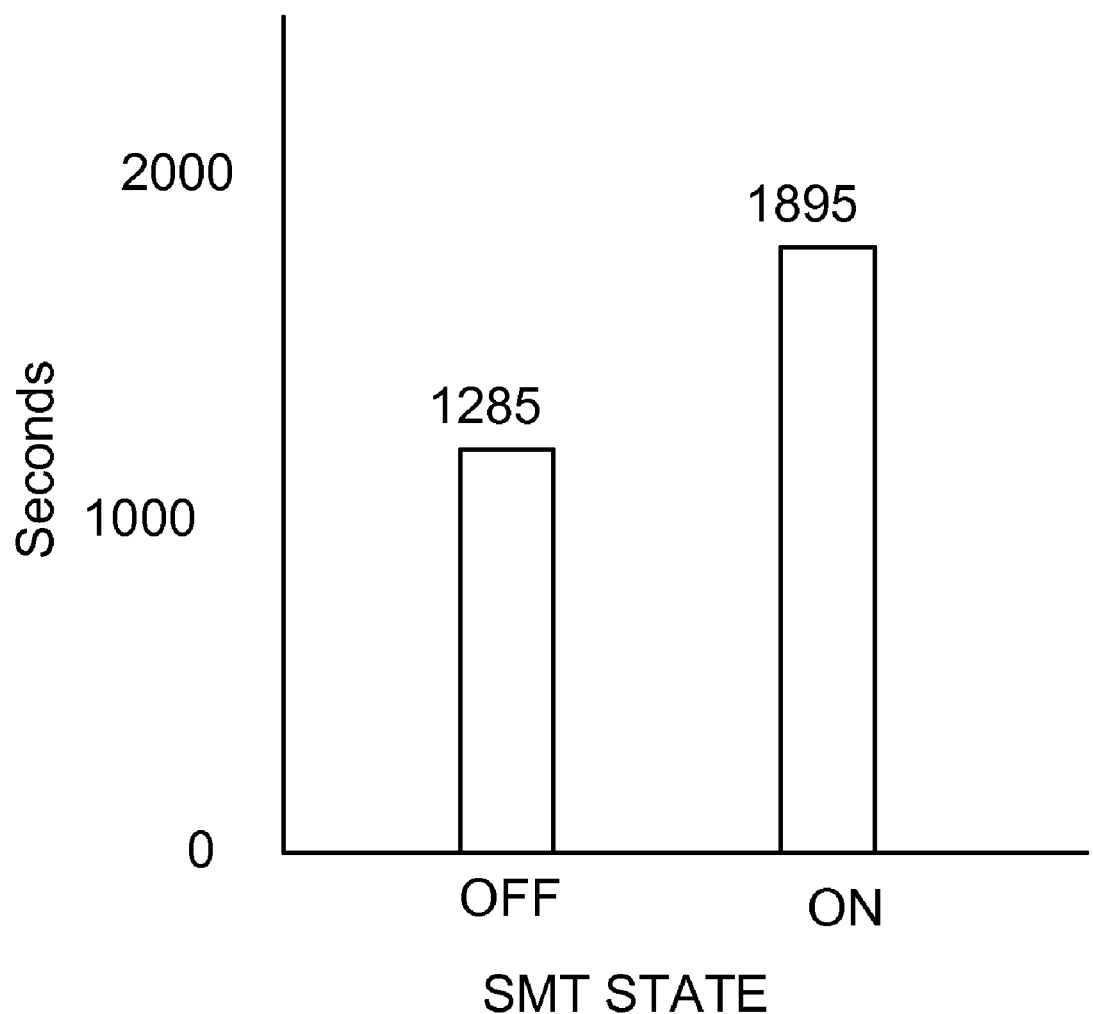
FIG. 2 is a chart showing the average TAT for the jobs competed on a 2way Power 5 system

The chart in FIG. 2 shows the average TAT for the jobs competed on a 2way Power 5 system. The first bar shows SMT OFF, and running 2 job threads and the second shows SMT ON, and running 4 job threads. Turning on SMT increased the elapsed time needed to run jobs by 48%.

Figure 3:
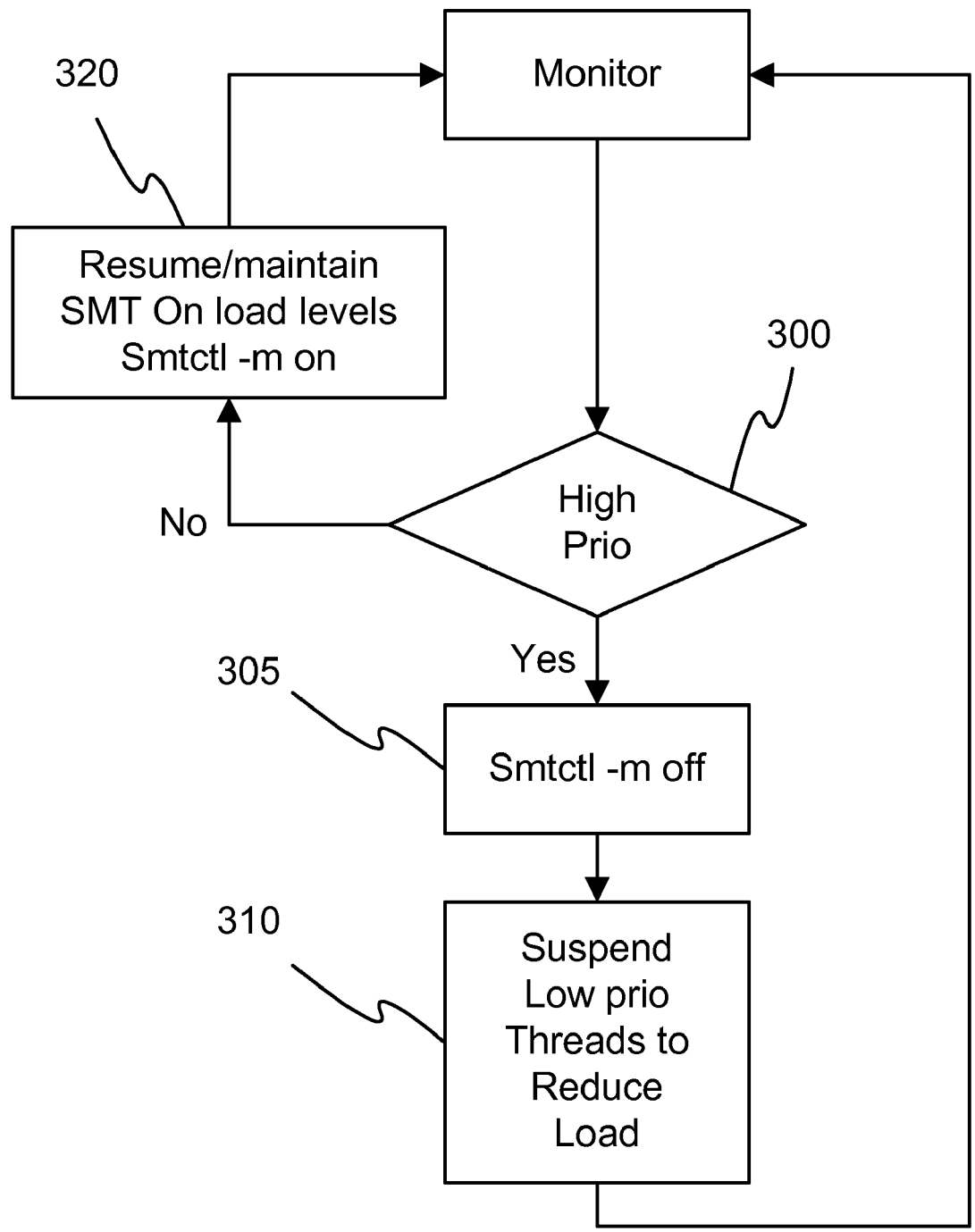
FIG. 3 shows how the SCM would control the batch job threads

FIG. 3 shows how the SCM would control the batch job threads for the jobs running on the machine. When it detects the presence of threads running under a high priority job queue (300), SMT would be turned off (305), and the suspendable job threads suspended (310) back to a processor load equal to the number of physical processors. When the high priority job threads are not present, SMT would be turned back on, and the suspendable job threads would be resumed (320) bringing the processor load back up. The processor load is defined as the number of threads allowed to be active at any point in time.

Table 1, shows how systems would be configured to run multiple low priority suspendable threads (usually 2) for each physical processor and either 1 non-suspendable med or 1 high priority job thread for each processor. This table shows a maximum processor load of 4 with SMT turned on and a processor load of 2 with SMT turned off.

TABLE 1

| Power5—2 physical processors | | | |
| --- | --- | --- | --- |
| Job Queues (by priority) | Threads Configured | Desired Load w/SMT OFF | Desired Load w/SMT ON |
| Low | 4 | 2—note 2 | 4 |
| Med | 2—note 1 | 2 | 4 |
| High | 2—note 1 | 2 | NA—note 3 | note 1: the total number of combined med and high priority threads should never exceed the number of physical processors, in this case 2.
note 2: 2 of the low priority threads would be suspended.
note 3: SMT would not be on, when high priority job threads are present.

Table 2 shows how the different job queues would control SMT and react to one another. Unless a high priority job is present, the low and med priority job queues would normally run with SMT on and maintain high processor loads. The presence of a high priority queue would cause SMT to be turned off, and the processor load levels dropped to a level equal to the number of physical processors. Low priority jobs would be suspended back to the processor load levels indicated for SMT off.

TABLE 2

| Job Queues | SMT State | Suspendable |
| --- | --- | --- |
| Low | on unless high present | yes |
| Med | on unless high present | no |
| High | off | no |

In summary the combination of toggling SMT and suspending and resuming job threads maximizes both throughput and turn around time as demanded by the jobs active on the machine. This idea allows for a higher level of throughput efficiency/capacity while still accommodating the critical work demands for shorter turn around times because it understands the importance of the work being preformed on the system.

An embodiment of the invention is a method for maximizing throughput and minimizing job turn-around-time in a multi-processing multi-threading system, the system comprises of one or more physical processors, dynamically enabling and disabling simultaneous multi-threading control. The method is comprised of the following steps:

The system monitors priority of all jobs executing, in which a first job among the jobs is a job executing on the one or more physical processors of the multi-processing multi-threading system and low priority job type is suspendable, medium priority job type is unsuspendable, and high priority job type is unsuspendable and has a higher priority than that of the medium priority job type.

If the first type is the high priority job type, then the system turns off the simultaneous multi-threading control of the multi-processing multi-threading system and suspends excess low priority suspendable jobs. The number of the excess low priority suspendable jobs is total number of the one or more physical processors, less total number of unsuspendable jobs, minus one.

Otherwise, the system turns on the simultaneous multi-threading control of the multi-processing multi-threading system and the resumption of low priority suspendable jobs.

A system, apparatus, or device comprising one of the following items is an example of the invention: multiprocessor, processor, multi-thread, jobs, prioritizing module, applying the method mentioned above, for the purpose of multithreading and management.

Any variations of the above teaching are also intended to be covered by this patent application.

The invention claimed is:

1. A method for maximizing throughput and minimizing job turn-around-time in a multi-processing multi-threading system, said system comprising one or more physical processors, said system dynamically enabling and disabling simultaneous multi-threading control in the one or more physical processors, said method comprising:
   monitoring priority of all jobs executing,
      wherein a first job among said all jobs is a job executing on said one or more physical processors of said multi-processing multi-threading system;
      wherein low priority job type is suspendable;
      wherein medium priority job type is unsuspendable;
      wherein high priority job type is unsuspendable and has a higher priority than that of said medium priority job type;
   if said first job is said high priority job type:
      setting said simultaneous multi-threading control of said multi-processing multi-threading system as off-state,
      limiting total number of said medium priority job type and said high priority job type to the number of said one or more physical processors, and
      suspending a number of low priority suspendable jobs,
      wherein the total number of high priority job, medium priority job and low priority jobs are not greater than the number of said one or more physical processors;
   else:
      setting said simultaneous multi-threading control of said multi-processing multi-threading system as on-state,
      limiting total number of said medium priority job type and said high priority job type to the number of said one or more physical processors, and
      allowing execution of additional low priority suspendable jobs simultaneously with said medium priority jobs and said high priority jobs.

* * * * *